US007783524B2

(12) United States Patent
Horton

(10) Patent No.: US 7,783,524 B2
(45) Date of Patent: *Aug. 24, 2010

(54) DELIVERY SYSTEMS AND METHODS INVOLVING VERIFICATION OF A PAYMENT CARD FROM A HANDHELD DEVICE

(75) Inventor: Mark Horton, Suwanee, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 6 days.

This patent is subject to a terminal disclaimer.

(21) Appl. No.: 12/170,896

(22) Filed: Jul. 10, 2008

(65) Prior Publication Data

US 2008/0270261 A1 Oct. 30, 2008

Related U.S. Application Data

(62) Division of application No. 10/960,462, filed on Oct. 6, 2004, now Pat. No. 7,428,502.

(51) Int. Cl.
*G06Q 30/00* (2006.01)
(52) U.S. Cl. .............................. 705/26; 705/1; 705/27; 235/383
(58) Field of Classification Search .................. 705/26, 705/27, 1; 235/383
See application file for complete search history.

(56) References Cited

U.S. PATENT DOCUMENTS

| 5,208,446 | A  | 5/1993  | Martinez |
| 6,040,783 | A  | 3/2000  | Houvener et al. |
| 6,167,383 | A  | 12/2000 | Henson |
| 6,185,683 | B1 | 2/2001  | Ginter et al. |
| 6,250,557 | B1 | 6/2001  | Forslund et al. |
| 6,539,360 | B1 | 3/2003  | Kadaba |
| 6,848,615 | B2 * | 2/2005 | Yamagami .................. 235/383 |
| 6,910,624 | B1 | 6/2005  | Natsuno |
| 7,209,733 | B2 | 4/2007  | Ortiz et al. |
| 7,341,186 | B2 | 3/2008  | Mrozik et al. |

(Continued)

FOREIGN PATENT DOCUMENTS

DE          101 46 033 A1      4/2003

(Continued)

OTHER PUBLICATIONS

Stephen Caswell, "Credit Card Fraud Crippling Online Merchants," Commerce Times, Mar. 20, 2000, pp. 1-2, http://www.ecommercetimes.com/story/2771.html.

(Continued)

*Primary Examiner*—Yogesh C Garg
*Assistant Examiner*—Anne M Georgalas
(74) *Attorney, Agent, or Firm*—Alston & Bird LLP

(57) ABSTRACT

The present invention relates generally to systems and methods that facilitate the prevention of fraud occurring in connection with credit cards, debit cards, smart cards and other payment cards that are used in transactions involving goods sold by a seller, delivered by a shipper, and purchased by a buyer. Specifically, the present invention provides systems and methods that allow for physical verification of a payment card (e.g., credit card) upon delivery of goods that are purchased in the context of a remote transaction between a buyer and a seller, including, for example, goods that are ordered via phone, mail order, fax or the Internet.

14 Claims, 4 Drawing Sheets

U.S. PATENT DOCUMENTS

| | | | |
|---|---|---|---|
| 2002/0032613 A1* | 3/2002 | Buettgenbach et al. | 705/26 |
| 2002/0156645 A1* | 10/2002 | Hansen | 705/1 |
| 2003/0040947 A1 | 2/2003 | Alie et al. | |
| 2003/0050850 A1 | 3/2003 | Sesek | |

FOREIGN PATENT DOCUMENTS

| | | |
|---|---|---|
| EP | 1 296 257 A1 | 3/2003 |
| EP | 1 486 924 A1 | 12/2004 |
| WO | WO 97/41499 | 11/1997 |
| WO | WO 00/52555 A3 | 8/2000 |
| WO | WO 00/52555 A | 9/2000 |

OTHER PUBLICATIONS

Steve Patient, "Regarding Online Credit Card Fraud," JupiterWeb Networks, Apr. 4, 2000, pp. 1-6, http://www.webdevelopersjournal.com/articles/card_fraud.html.

Rick Olson, "12 Ways to protect Your Business From Online Credit Card Fraud—Prevent Loss of Goods and Chargebacks," The Perl Archive, Dec. 1, 2000, pp. 1-6, http://www.perlarchive.com/_TLC/7111.shtml.

Steve MA. Reyna, "How to Protect Your Online Business From Credit Card Fraud," Power HomeBiz Newsletter, 2001, pp. 1-4, http://web.archive.org/web/20010620211642/http://www.powerhomebiz.com/vol34/fraud.htm.

RFID Journal, "MasterCard to Test RFID Card," Dec. 20, 2002, pp. 1-2, http://www.rfidjournal.com/article/articleprint/171-1/1/.

"Portable Credit Card Swipe Machine Ported to CDMA2000," Jun. 8, 2003, http://www.cellular.com.za/news_2003/041303-portable_credit_cad_swipe_machi.htm.

Brian Bergstein, "Credit Cards' Future Unlikely to Include Swipe," The Mercury News, Dec. 21, 2003, pp. 1-3, http://www.Mercurynews.com/mld/mercurynews/business/7544236.htm?lc.

International Search Report from corresponding International Application No. PCT/US2005/024086 dated Jul. 7, 2005.

Duffy, Caroline "UPS toes the line with is package-tracking technologies", PC Week, V10, N25, p. 211(1); Jun. 28, 1993;Retrieved from Dialog File: 148, #06495113.

* cited by examiner

DELIVERY SYSTEMS AND METHODS INVOLVING VERIFICATION OF A PAYMENT CARD FROM A HANDHELD DEVICE

CROSS-REFERENCE TO RELATED APPLICATIONS

This application is a divisional application of U.S. application Ser. No. 10/960,462, filed Oct. 6, 2004 now U.S. Pat. No. 7,428,502, which is hereby incorporated herein in its entirety by reference.

FIELD OF THE INVENTION

The present invention relates generally to systems and methods that facilitate the prevention of fraud occurring in connection with credit cards, debit cards, smart cards and other such payment cards used in transactions involving goods sold by a seller, delivered by a shipper, and purchased by a buyer.

BACKGROUND OF THE INVENTION

In recent years, many online businesses have become increasingly concerned with the challenges and costs that are associated with online credit card fraud. Unless otherwise indicated, the term "credit card fraud," as used herein, refers to any fraudulent purchase or transaction that involves the use of a credit card, debit card, smart card or any other such payment card. Similarly, the term "payment card," as used herein, refers to any type of credit card, debit card, smart card or other such card that can be used as a means of purchasing things.

In a traditional face-to-face credit card transaction between a buyer and a seller, physical presence offers a level of security based in part on the ability of the seller to obtain the buyer's signature along with an imprint, swipe or scan of the buyer's card. The information obtained from the buyer's card can be used to determine, for example, whether the card is a valid card that has not been reported lost or stolen, and whether the card has sufficient free credit available to fund the current purchase. In other words, an initial check is performed to insure that the payment card is at least listed as active and in good standing with the appropriate credit authority. Typically, if the card satisfies this initial verification stage, the seller will proceed with obtaining the buyer's signature so as to compare it against the signature on the card. In some cases, such as when the card has not been signed, or when other factors dictate that additional precautions be taken, the seller may require the buyer present a second form of identification such as a driver's license. Other, more advanced credit card fraud prevention techniques have also been developed over the years. These include, for example, the development of payment cards which have anti-tamper signature areas, holograms and even the etched image of a card's owner.

When transactions are completed in person, the implementation of these and other such precautions typically allow merchants to avoid liability in the event that fraud occurs. In such cases, the issuing bank that approved the transaction will usually bear the burden of the chargeback. On the other hand, when a merchant is completing a transaction in which a payment card is not physically presented—as occurs for orders placed via phone, mail order, fax and the Internet—the merchant is almost always liable. In other words, each of the fraud protection techniques described above is of little or no value when it comes to transactions that are performed remotely (e.g., via phone or the Internet), as the merchant never gets to see the credit card and verify the signature. As a result, the merchant (and not the card issuer) is almost always responsible for losses from sales that are made in this way.

More particularly, Internet credit card transactions fall under the heading of MOTO (Mail Order/Telephone Order) transactions, which are also referred to as CNP or Cardholder-Not-Present transactions. As indicated above, many credit card merchant account agreements leave the merchant one-hundred percent liable for fraud committed via a MOTO (or CNP) transaction. Thus, any fraudulent transaction that occurs via phone, mail order, fax or the Internet often results in a "chargeback" for the merchant who made the sale. This means that when there is a dispute over a charge (such as a fraudulent use of a credit card by the buyer, or a cardholder's winning of a dispute over whether the charge was authorized), the online merchant must pay back the amount of the original charge, plus any penalties, to the cardholder's bank. Furthermore, if a merchant experiences a high level of chargebacks, the merchant can often be hit with an increase in the discount rate they have to pay on each transaction. In some cases, the merchant may even have their account terminated, and, once lost, a credit card merchant account can be extremely difficult to obtain again.

Today, online merchants are strongly encouraged to implement a number of protections that may help to reduce the risk of online credit card fraud. Some of these protections include, for example, the use of Address Verification Systems (AVS) where available, checking to make sure the shipping and billing address match, avoiding purchases that involve free e-mail accounts, and calling the cardholder if there is any reason to doubt that the person receiving the merchandise is not the authorized cardholder. However, despite the implementation of these and other such protections, phone, mail-order, fax and Internet shipment fraud is often still perpetrated for the simple fact that vendors conducting business on a cardholder-not-present basis cannot mange the physical credit card verification process.

A need therefore exists in the industry for improved credit card verification systems and methods that overcome deficiencies in the prior art, some of which are discussed above.

BRIEF SUMMARY OF THE INVENTION

The present invention relates generally to systems and methods that facilitate the reduction of fraud occurring in connection with credit cards, debit cards, smart cards and other payment cards that are used in transactions involving goods sold by a seller, delivered by a shipper, and purchased by a buyer. Specifically, the present invention provides systems and methods that allow for physical verification of a payment card (e.g., credit card) upon delivery of goods that are purchased in the context of a remote transaction between a buyer and a seller, including, for example, goods that are ordered via phone, mail order, fax or the Internet.

In one embodiment of the present invention, a system for delivering goods being sold by a seller, delivered by a shipper, and purchased by a buyer is described that includes a seller computer for receiving via a network a request from the buyer to purchase the goods, the purchase of the goods to occur pursuant to a payment card transaction involving the buyer, the seller and the shipper, the payment card transaction requiring at least two segments, a first transaction segment occurring between the buyer and the seller and a second transaction segment occurring between the shipper and the buyer; a shipper computer for receiving via a network a shipping request from the seller, the shipping request comprising instructions to deliver the goods to the buyer pursuant to the payment card transaction, the shipping request further comprising information relating to the first transaction segment of the payment card transaction; and a portable computing device that is configured for obtaining information from the buyer and, based at least in part on the information from the buyer, attending to the second segment of the payment card transaction.

In another embodiment of the present invention, a system for delivering goods being sold by a seller, delivered by a shipper, and purchased by a buyer located at a delivery location is described that includes a seller computer for receiving a request from the buyer to purchase the goods, the purchase of the goods to occur pursuant to a payment card transaction involving the buyer, the seller and the shipper, the payment card transaction requiring at least two segments, a first transaction segment occurring between the buyer and the seller and a second transaction segment occurring between the shipper and the buyer; a shipper computer for receiving a shipping request from the seller, the shipping request comprising instructions to deliver the goods to the buyer pursuant to the payment card transaction, the shipping request further comprising information relating to the first transaction segment of the payment card transaction; a delivery vehicle for carrying the goods to a location proximate the delivery location; and a portable computing device that is configured for attending to the second segment of the payment card transaction by at least scanning the payment card of the buyer and obtaining a signature from the buyer.

In another embodiment of the present invention, a system for delivering goods being sold by a seller, delivered by a shipper, and purchased by a buyer located at a delivery location is described that includes a seller computer for receiving a request from the buyer to purchase the goods, the purchase of the goods to occur pursuant to a payment card transaction involving the buyer, the seller and the shipper, the payment card transaction requiring at least two segments, a first transaction segment occurring between the buyer and the seller and a second transaction segment occurring between the shipper and the buyer; a shipper computer for receiving a shipping request from the seller, the shipping request comprising instructions to deliver the goods to the buyer pursuant to the payment card transaction, the shipping request further comprising information relating to the first transaction segment of the payment card transaction; a delivery vehicle for carrying the goods to a location proximate the delivery location; and a portable computing device that is configured for attending to the second segment of the payment card transaction by at least: scanning the payment card of the buyer and checking the validity and available credit on the payment card by wireless means to determine if the card is active and in good standing; and pursuant to finding that the card is active and in good standing, obtaining a signature from the buyer.

In another embodiment of the present invention, a method of delivering goods being sold by a seller, delivered by a shipper, and purchased by a buyer is described that includes the steps of: the shipper accepting goods from the seller along with instructions to deliver the goods to the buyer pursuant to a payment card transaction involving the buyer, the seller and the shipper, the payment card transaction requiring at least two segments, a first transaction segment occurring between the buyer and the seller and a second transaction segment occurring between the shipper and the buyer; the shipper accepting information from the seller relating to the first transaction segment of the payment card transaction; the shipper obtaining information from the buyer and, based at least in part on the information from the buyer, attending to the second segment of the payment card transaction; and subsequent to the completion of the second segment, the shipper relinquishing the goods to the buyer.

In yet another embodiment of the present invention, a method of delivering goods being sold by a seller, delivered by a shipper, and purchased by a buyer located at a delivery location is described that includes the steps of: the shipper accepting goods from the seller along with instructions to deliver the goods to the buyer pursuant to a payment card transaction involving the buyer, the seller and the shipper, the payment card transaction requiring at least two segments, a first transaction segment occurring between the buyer and the seller and a second transaction segment occurring between the shipper and the buyer; the shipper accepting information from the seller relating to the first transaction segment of the payment card transaction; the shipper carrying the goods to a location proximate the delivery location; subsequent to the carrying step above, the shipper obtaining information from the buyer and, based at least in part on the information from the buyer, attending to the second segment of the payment card transaction; and subsequent to the completion of the second segment, the shipper relinquishing the goods to the buyer.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
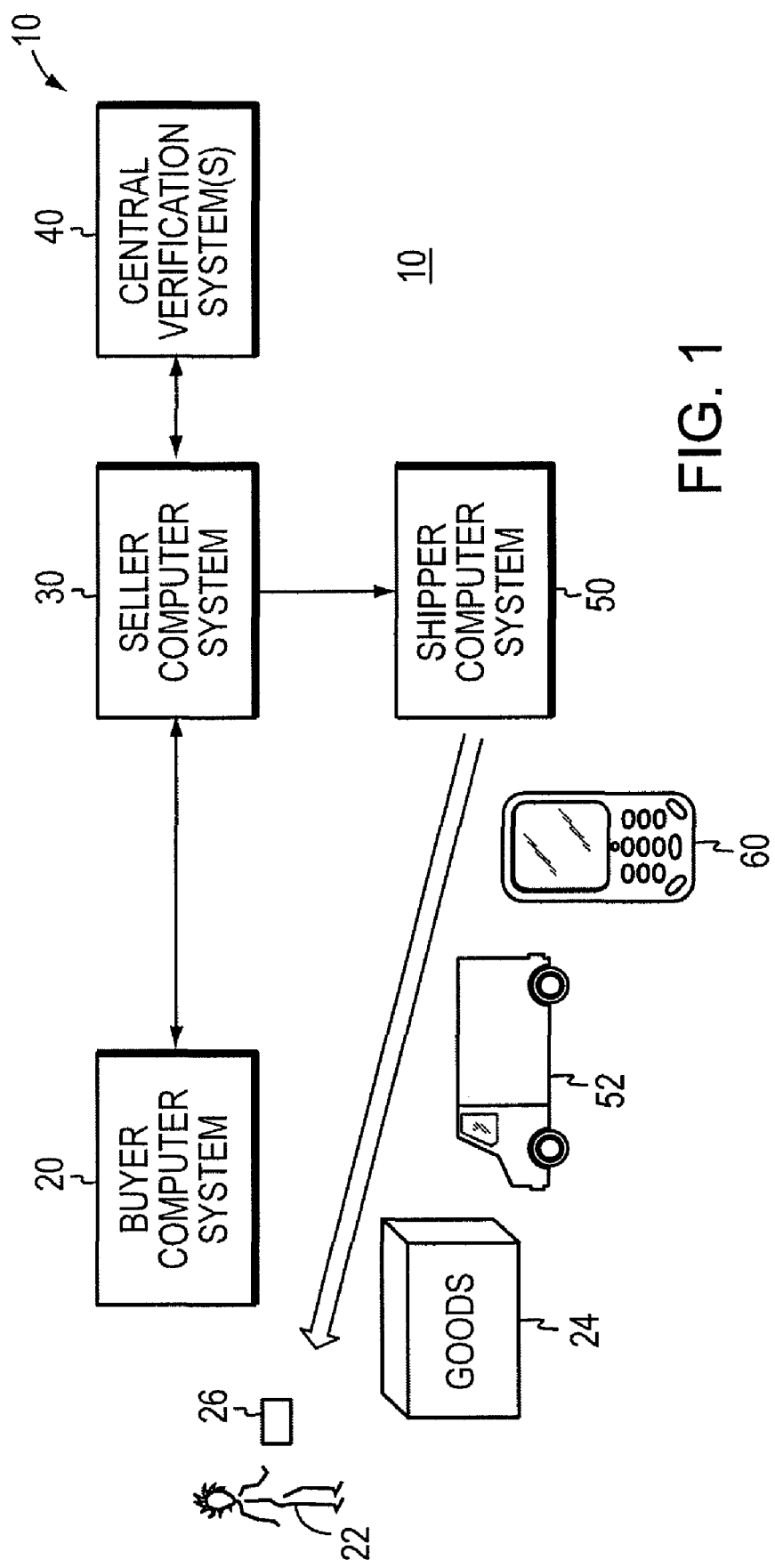
FIG. 1 illustrates a payment card verification and delivery system in accordance with an embodiment of the present invention.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the invention set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The present invention is described below with reference to block diagrams and flowchart illustrations of methods, apparatus (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the system or flowchart blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems which perform the specified functions or steps, or combinations of special purpose hardware and computer instructions.

Other objects, features, and advantages of the present invention will become apparent upon reading the following detailed description of the preferred embodiments of the invention when taken in conjunction with the drawings and the appended claims.

Overview

The present invention relates generally to systems and methods that facilitate the reduction of fraud occurring in connection with credit cards, debit cards, smart cards and other payment cards that are used in transactions involving goods sold by a seller, delivered by a shipper, and purchased by a buyer. Specifically, the present invention provides systems and methods that allow for physical verification of a payment card (e.g., credit card) upon delivery of goods that are purchased in the context of a remote transaction between a buyer and a seller, including, for example, goods that are ordered via phone, mail order, fax or the Internet.

FIG. 1 illustrates a payment card verification and delivery system 10 in accordance with an embodiment of the present invention. The verification and delivery system 10 comprises several subsystems and components, including a buyer computer system 20, a seller computer system 30, a central payment-card verification system 40, a shipper computer system 50, and a portable computing device 60. Each of these systems and components is described in detail below. Although the present invention is described in the context of a package delivery system, one of ordinary skill in the art will readily recognize that the functions described herein are equally advantageous with other types of payment card verification and delivery systems as well.

According to one embodiment, a buyer 22 uses the computer system 20 to remotely purchase a set of goods 24 from an online seller 30 via the Internet. In other embodiments, a buyer may instead choose to remotely purchase goods from a seller via phone, mail order, fax or other such communications means. However, in the embodiment shown, the buyer 22 can use a common web browser displayed on the computer system 20 to submit a purchase request to the seller computer system 30 via a network (not shown), such as the Internet. A typical purchase request submitted by an online buyer includes shipping information for identifying a location to which the goods 24 are to be delivered, and billing information for identifying a particular payment card 26, which the buyer 22 has selected for use in purchasing the goods.

In a preferred embodiment, a shipper 50 such as the United Parcel Service (UPS) accepts the goods 24 from the seller 30 along with instructions to deliver the goods to the buyer 22 pursuant to a payment card transaction that will ultimately involve the buyer, the seller and the shipper. In one embodiment, the specialized shipping instructions can be transmitted from the seller computer system 30 to the shipper computer system 50 at or near the time that a corresponding request for shipping services is made by the seller to the shipper. The payment card transaction noted above typically requires at least two segments. The first transaction segment generally begins with an exchange of information between the buyer and the seller. Specifically, this includes having the buyer submit information to the seller, which includes shipping information that is used for identifying where the goods 24 are to be delivered to, and billing information for identifying the payment card 26, which the buyer has selected for use in purchasing the goods.

The first transaction segment may also include an initial payment card verification stage that includes one or more fraud protection measures, which the seller is able to perform without the benefit of having both the card and the cardholder physically present. For example, after receiving a purchase request from the buyer computer system 20, the seller computer system 30 can be used to submit some or all of the received payment card information to the central payment card verification system 40. The central payment card verification system 40 can then return such information as whether the payment card is a valid card that has not been reported lost or stolen, and whether the card has sufficient free credit available to cover the current purchase. The online seller may choose to perform other known verification procedures as well, some of which are mentioned above The second transaction segment occurs in person between the shipper and the buyer, typically upon delivery of the goods. Specifically, this segment involves having the driver of a delivery vehicle 52 perform a series of in-person verification procedures with the buyer 22. In one embodiment, the process begins by having the driver of the delivery vehicle 52 request that the buyer 22 present the same payment card 26, which was used to purchase the goods 24 from the seller 30. Once the buyer has physically presented the payment card 26 to the driver, the driver can use the portable computing device 60 to perform one or more verification and validation steps. This may include, for example, scanning (or swiping) the payment card 26, checking to see if the card is valid (e.g., via a wireless transmission), and obtaining an electronic version of the buyer's signature. Based on the outcome of these and/or other agreed upon in-person verification procedures, the driver can make a final determination as to whether or not final control of the goods 24 should be relinquished to the buyer 22.

The present invention substantially reduces the risk of payment card fraud, which might otherwise be perpetrated against merchants conducting business via phone, mail order, fax or the Internet. In particular, the present invention provides increased assurance that the buyer 22 to whom the goods 24 are being delivered is in fact the authorized cardholder of the payment card 26, which was used to purchase the goods. By allowing the seller 30 to maintain control over the goods 24 (via the shipper 50) until such point that the payment card 26 can be verified in person, upon physical presentation of the card, the present invention provides a level of security that is at least comparable to what can be achieved during a typical face-to-face payment card transaction between a buyer and a seller.

Buyer-Seller Portion(s) of Transaction

Figure 2:
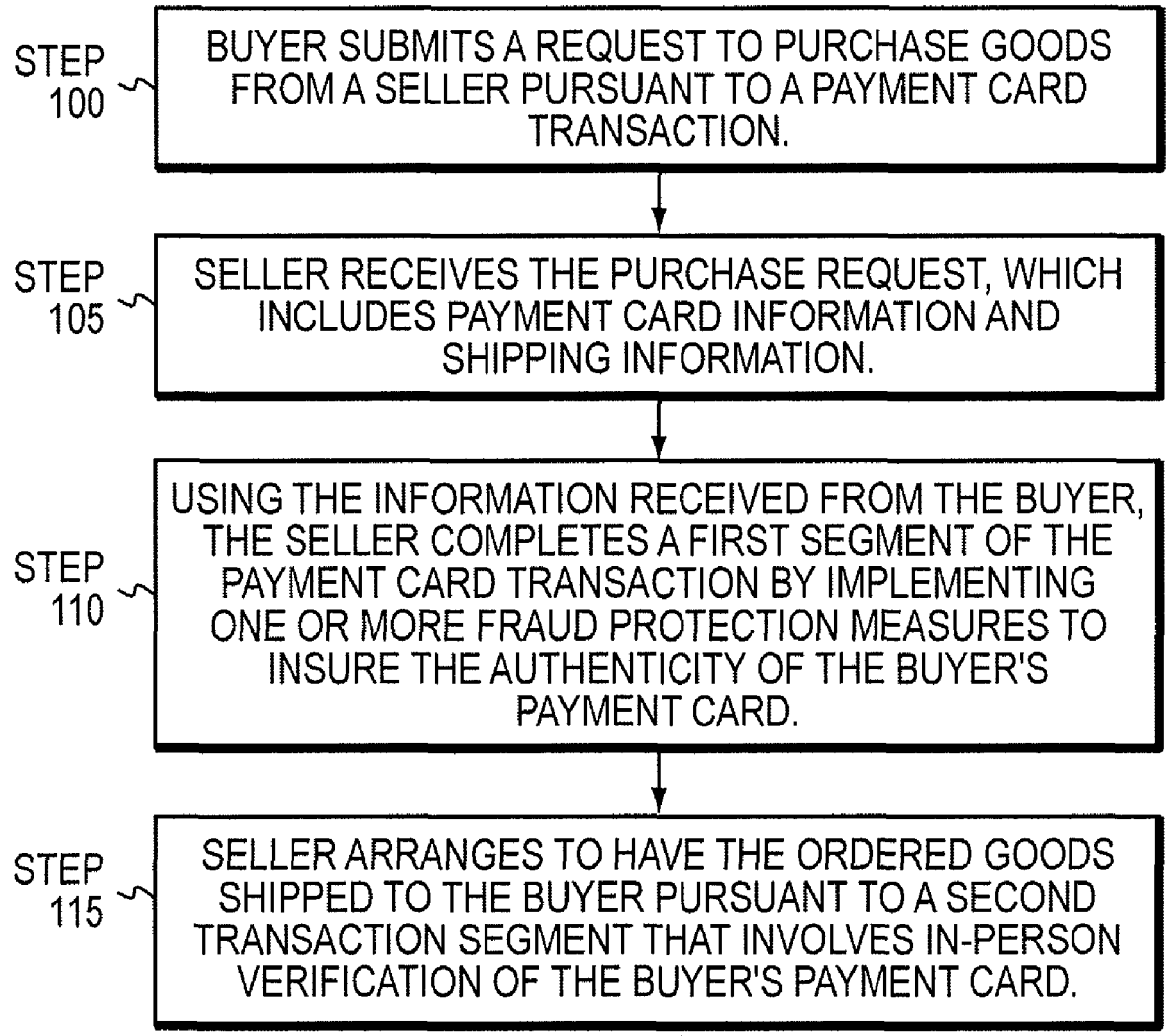
FIG. 2 is a process flow diagram that illustrates the steps in performing a buyer-seller portion of a payment card transaction conducted in accordance with an embodiment of the present invention.

Reference is now made to FIG. 2, which is a process flow diagram that illustrates the steps in performing a buyer-seller portion of a payment card transaction conducted in accordance with an embodiment of the present invention.

The process begins, at Step 100, when a buyer submits a purchase request to remotely purchase goods from a seller pursuant to a payment card transaction. Transactions occurring "remotely," as the term is used herein, may include, for example, the purchase of items via phone, mail order, fax, the Internet or other such commonly used communications means. In one embodiment, the remote purchase of goods involves a buyer 22 who is using a computer system 20 to purchase a set of goods 24 from an online seller 30 via the Internet. This type of remote transaction typically involves having the buyer enter a set of order-related information into a web browser so that the information can be submitted to the seller via the Internet in a well known manner. In addition to specifying the goods 24 or other items that the buyer is ordering, the information entered by the buyer 22 typically includes billing information and shipping information. The shipping information is used for identifying a location to which the goods 24 are to be delivered, and the billing information is used for identifying a particular payment card 26, which the buyer has selected for use in purchasing the goods.

At Step 105, the seller 30 receives the purchase request, which includes both the payment card information and the shipping information. At Step 110, using the information received from the buyer, the seller 30 completes a first segment of the payment card transaction by implementing one or more fraud protection measures, which help to insure the authenticity of the buyer's payment card 26. Some of these protections may include, for example, the use of Address Verification Systems (AVS) where available, checking to make sure the shipping and billing address match, avoiding purchases that involve free e-mail accounts, and calling the cardholder if there is any reason to doubt that the person receiving the merchandise is not the cardholder. Typically, the seller 30 will also contact a central verification system 40 to confirm that the payment card 26 is a valid card that has not been reported lost or stolen, and that the card has sufficient free credit available to fund the current purchase, which the buyer is attempting to make.

If, as a result of the first payment card transaction segment described above, the seller 30 agrees to proceed with the sale of the goods 24 to the buyer 22, then, at Step 115, the seller arranges to have the ordered goods shipped to the buyer pursuant to a second payment card transaction segment that involves the in-person verification of the buyer's payment card 26. In one embodiment, the second payment card transaction segment can occur at a location where the buyer 22 picks up the goods 24 from the shipper 50. In another embodiment, the second payment card transaction segment occurs upon delivery of the goods to the buyer by a driver of a delivery vehicle 52. This portion of the overall transaction is described in detail below.

Seller-Shipper Portion(s) of Transaction

Figure 3:
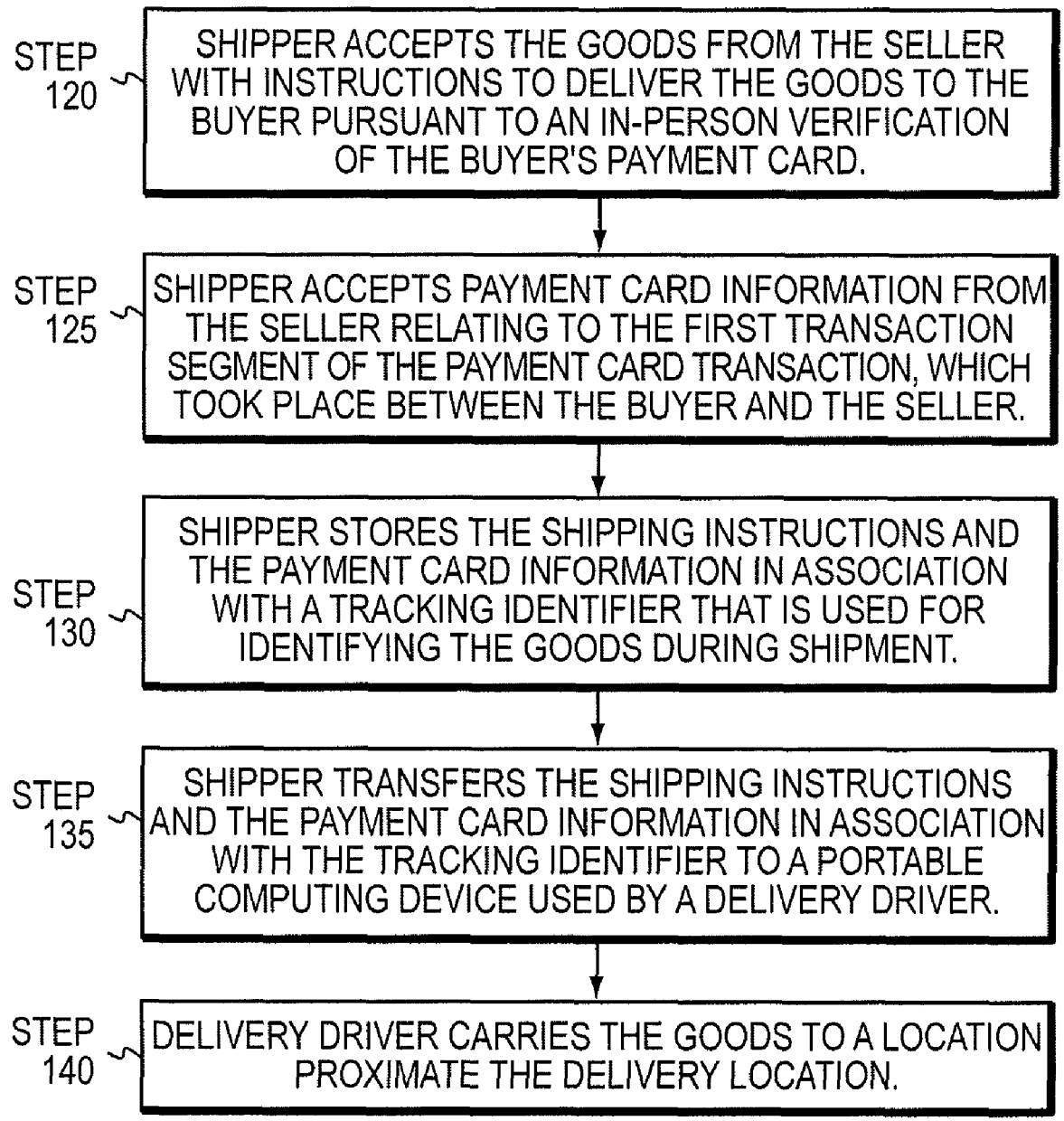
FIG. 3 is a process flow diagram that illustrates the steps in performing a seller-shipper portion of a payment card transaction conducted in accordance with an embodiment of the present invention.

Reference is now made to FIG. 3, which is a process flow diagram that illustrates the steps in performing a seller-shipper portion of a payment card transaction conducted in accordance with an embodiment of the present invention.

At Step 120, a shipper 50 such as UPS accepts the goods 24 from the seller 30 with instructions to deliver the goods to the buyer pursuant to an in-person verification of the buyer's payment card 26. The shipper 50, at Step 125, also accepts payment card information from the seller, which relates to the first transaction segment of the payment card transaction between the buyer and the seller. The payment card information received by the shipper 50 from the seller 30 may include some or all of the information that was obtained by the seller from the buyer. This information preferably includes at least enough data to allow the shipper to identify the particular payment card 26 that was used by the buyer to initiate the purchase of the goods 24 from the seller.

In one embodiment, this information can include the name and number that is purported to appear on the face of the payment card 26. In another embodiment, the payment card information provided to the shipper 50 by the seller 30 may further include the expiration date of the card and/or an additional three digit security code, which can be found on the back of some payment cards. The information may also include a brief description of the type of payment card 26 that they buyer used, such as an indication that it is a Visa™ card. As with other types of shipping requests, the payment card information along with the seller's request to have the shipper verify the corresponding payment card 26 upon delivery, can be provided to the shipper via phone or via an Internet shipping request form (or web page), which includes one or more data fields for entering the type of information described above. In one embodiment, the payment card information received by the shipper 50 allows the driver of the delivery vehicle 52 to identify (and validate) the same payment card 26, which was used to initiate the remote transaction between the buyer 22 and the seller 30.

According to one embodiment, the shipper 50, at Step 130, stores the shipping instructions and the related payment card information in association with a tracking identifier, which was generated by the shipper for use in identifying the goods 24 during shipment. The use of tracking identifiers to identify and track the movement of packages and other such items through a transportation system is well known in the art. The goods 24 are then transported through the shipper's transportation network until such time that they reach a destination facility. As used herein, a "destination facility" refers to the last carrier facility to handle the goods 24 before they are picked up by the buyer or delivered to the buyer by the driver of a delivery vehicle 52. In one embodiment, if the buyer 22 elects to pick up the goods 24, then many of the steps described below between the shipper and the buyer can occur at the destination facility, or other such pickup location.

On the other hand, to facilitate delivery of the goods 24 to the buyer 22 (pursuant to an overall payment card transaction as generally described above), the shipper 50, at Step 135, transfers the shipping instructions and related payment card information to the portable computing device 60 used by the driver of the delivery vehicle 52.

Specifically, in one embodiment, the goods 24 are loaded onto the delivery vehicle 52 at the destination facility during a stage of the shipping process that is sometimes referred to as the pre-load stage. In association with the items loaded onto the delivery vehicle 52, a manifest of the work assigned to the driver is downloaded to the portable computing device 60 carried by the driver on his or her route. In the present invention, the manifest of work includes the particular shipping instructions and related payment card information associated with the goods 24. This information, as with other package detail information, can be stored on the device 60 in association with the tracking identifier that is used by the shipper to identify the goods 24. As will be described in detail below, the information stored on the device 60 can be used to notify the driver (e.g., upon performing a destination scan of the goods) that delivery of the goods 24 is to occur subject to the driver completing an in person verification of the buyer's payment card 26.

Portable devices of this type are known in the art as evidenced by the delivery information acquisition device (DIAD) unit that UPS drivers have carried since the early 1990's. Since its introduction, UPS drivers have used the DIAD unit to collect package information. In the past, package data would be collected and stored in the DIAD unit while the driver was away from the delivery vehicle servicing their customers. When the driver returned to the vehicle, the DIAD would be placed in a vehicle adapter that facilitated the transmission of the package data to a central storage facility. A package tracking database was then updated with the package data, which allowed customers to track the movement and delivery of their packages in the UPS system. More recent versions of the DIAD unit are equipped with cellular and wireless radios and thereby allow the transmission of package data directly between the DIAD unit and the central storage facility.

As described below, the DIAD and other such portable computing devices can be equipped with software and hardware to capture, process and store information relating to the in person verification of payment cards. The existence of handheld devices containing both software and hardware for capturing, processing and storing information related to payment cards is well known by those of ordinary skill in the art, as evidenced by the numerous portable devices produced by such companies as Semtek™ Inc., Scanning Devices™ Inc., and Verifone™, to name just a few. With the corresponding delivery instructions and related payment card information loaded onto the portable computing device 60, the driver of the delivery vehicle 52, at Step 140, carries the goods 24 to a location proximate the delivery location.

Shipper-Buyer Portion(s) of Transaction

Figure 4:
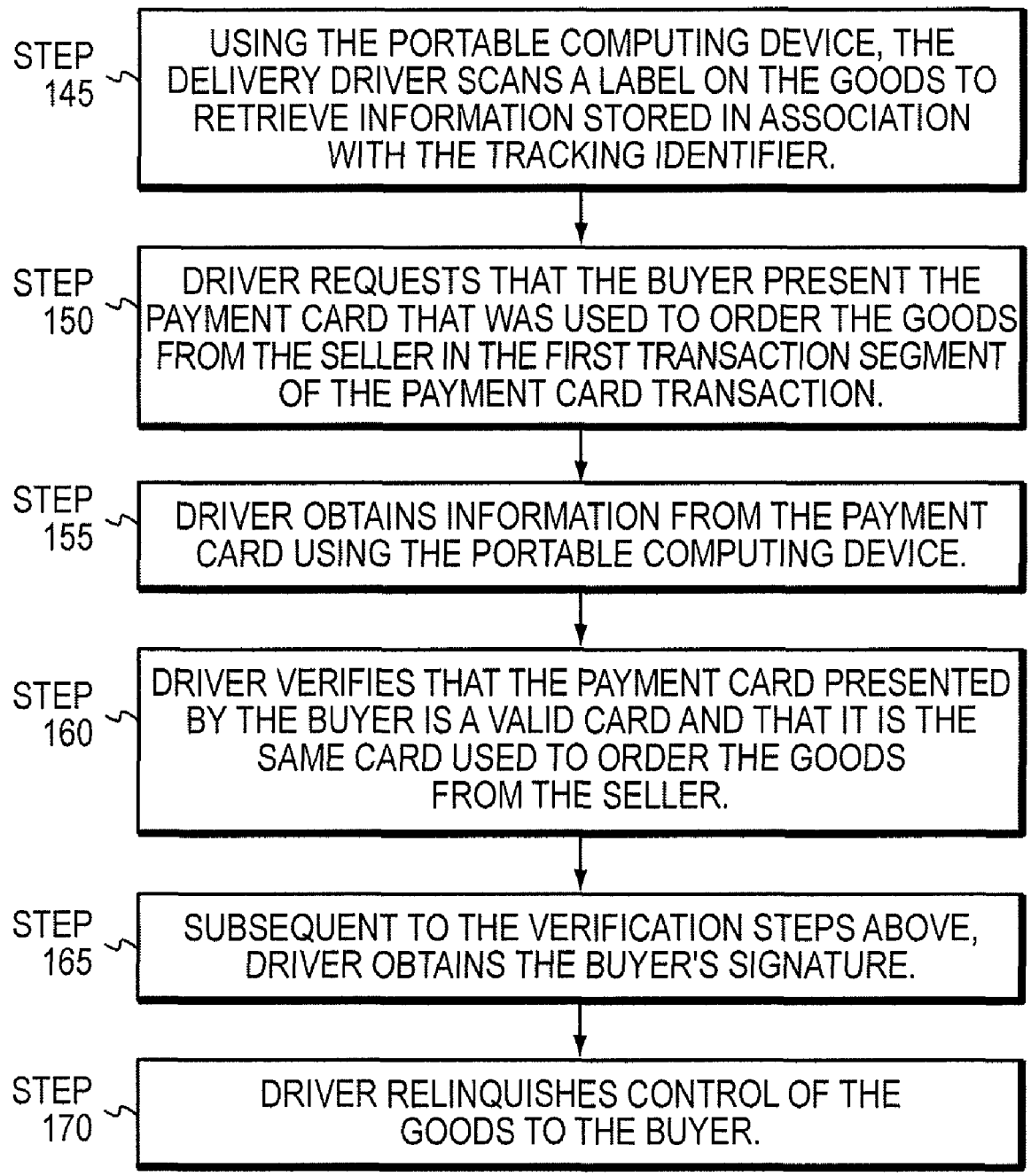
FIG. 4 is a process flow diagram that illustrates the steps in performing a shipper-buyer portion of a payment card transaction conducted in accordance with an embodiment of the present invention.

Reference is now made to FIG. 4, which is a process flow diagram that illustrates the steps in performing a shipper-buyer portion of a payment card transaction conducted in accordance with an embodiment of the present invention.

After carrying the goods 24 to a location proximate the delivery location, the driver of the delivery vehicle 52, at Step 145, uses the portable computing device 60 to retrieve stored information associated with the goods 24. This can be accomplished in a known manner by, for example, scanning a shipping label associated with the goods. In one embodiment, the tracking identifier (or other such identifier) associated with the goods 24 is used to access information stored locally on the device 60. In another embodiment, the tracking identifier associated with the goods 24 can be used to access information that is stored remotely in a central database. As indicated above, remote access to such information can be facilitated by the device 60 having one or more cellular or wireless data radios.

The information retrieved by the device 60 preferably includes a notification (or reminder) to the driver that delivery of the goods 24 is to include an in-person verification of the buyer's payment card 26. In one embodiment, the information retrieved by the device 60 also includes payment card information relating to the first payment-card transaction segment conducted remotely between the buyer 22 and the seller 30. Specifically, the payment card information provided to the driver by the device 60 can include the name, number, expiration date, etc., of the payment card that was used by the buyer in the first transaction segment. The information retrieved by the device 60 can further include one or more business rules, which specify the nature of the verification procedure that is to occur during the in-person payment card verification process between the driver of the delivery vehicle 52 and the buyer 22. This may include, for example, an additional requirement that the buyer present a second form of identification, such as a driver's license.

At Step 150, the driver requests that the buyer 22 physically present the payment card 26, which was used to order the goods 24 from the seller 30 in the first transaction segment. Once the payment card 26 has been physically presented by the buyer 22, the driver, At Step 155, obtains information from the payment card using the portable computing device 60.

In one embodiment, the portable computing device 60 is equipped with an alphanumeric keypad that allows the driver to manually enter information (e.g., name, card number, expiration date, etc.) displayed on the payment card 26. In another embodiment, the portable computing device 60 is equipped with a magnetic stripe reader that can be used for swiping payment cards in a known manner. In yet another embodiment, the device 60 is equipped with a portable RFID (Radio Frequency Identification) reader that is configured to read RFID-enabled payment cards, which (though not as prevalent as traditional magnetic stripe payment cards) have been placed into limited circulation by such companies as Master-Card™ and American Express™. In yet other embodiments, the portable computing device 60 can be configured to receive payment card information from a separate data capture device (not shown), which uses any one of the methods described above to capture the information from the payment card 26. In one such embodiment, the separate data capture device includes a handheld magnetic stripe reader (or an RFID reader) that captures information from the payment card 26 and communicates it to the portable computing device 60 via a Bluetooth-enabled wireless link.

At Step 160, the driver uses the information obtained from the payment card 26 to verify that the payment card 26 presented by the buyer is in fact a valid card that has not been reported lost or stolen and, in at least one embodiment, that it is the same card used to order the goods 24 from the seller 30. The validity of the payment card can be checked by transmitting the payment card information from the portable computing device 60 via a wireless link to the central payment card verification system 40. If the payment card 26 presented by the buyer 22 fails to satisfy one or more validation and verification requirements, then the portable computing device 60 can be configured to provide an audio (or visual) alert to the driver. If an alert is generated, the driver may be instructed to take alternate or additional measures to remedy the problem. If the problem cannot be remedied, possibly indicating that the buyer 22 ordered the goods from the seller 30 pursuant to a fraudulent payment card transaction, the driver may be instructed by the device 60 not to complete the delivery of the goods 24 to the buyer.

However, if the status of the payment card 26 is verified (i.e., reported as active and in good standing) under a given set of rules such as described above, for example, then, at Step 165, the driver continues the process by obtaining the buyer's signature. The buyer's signature is preferably captured in an electronic format using the portable computing device 60. In one embodiment, the driver visually compares the signature obtained from the buyer to a signature on the payment card so as to provide further assurance that the buyer 22 is in fact the authorized cardholder of the payment card 26, which was used to obtain the goods 24 from the seller 30. The verification process may further include having the driver 52 request that the buyer present a second form of identification such as a driver's license. In another embodiment, the portable computing device 60 includes signature recognition software, which can be used to automatically verify the authenticity of the buyer's signature. Signature recognition software (including for handheld devices) is well known in the art, but generally requires access to a history of the buyer's signature to which the current digitally captured version can be compared using a variety of techniques known in the art.

In yet another embodiment, the computing device 60 can include a camera for taking a picture of the buyer 22 prior to relinquishing control of the goods 24. This capability may, in some cases, provide an additional deterrent against fraudulent transactions. This may be especially true if the buyer 22 is made aware of the fact, in advance of purchasing the goods, that delivery will be contingent upon submitting to such a request. Note that in another embodiment, the camera may be separate from the computing device 60 (i.e., not integral to the device), in which case the image of the buyer 22 could be transmitted wirelessly (e.g., via Bluetooth technology) from the separate camera device to the computing device 60 (or to any other device or system being used in connection with the delivery of the goods 24). Preferably, a digital camera is used to take the picture of the buyer 22 so that the data corresponding to such picture can be stored in an appropriate format as an image file.

If all designated verification procedures associated with a particular delivery have been satisfied, and, for example, the buyer's signature has been obtained and authenticated, then, at Step 170, the driver relinquishes control of the goods 24 to the buyer 22. In this way, the overall payment card transaction, which was initiated remotely (e.g., via the Internet or by phone), is completed pursuant to an in-person verification process involving physical presentation of the payment card.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

That which is claimed:

1. A system for the delivery of goods being sold by a seller, delivered by a shipper, and purchased by a buyer, the system comprising:
    one or more shipper computers configured to:
        receive shipping instructions, from a seller computing device, to deliver goods to a buyer pursuant to a payment card transaction involving the buyer, a seller, and a shipper, the payment card transaction requiring at least two transaction segments including: (a) a first transaction segment occurring between the buyer and the seller, wherein the seller charges a payment card of the buyer prior to shipment of the goods from the seller to the buyer, and (b) a second transaction segment occurring between the shipper and the buyer, wherein the shipper performs, at the point of delivery, an in-person verification of the payment card used in the first transaction segment;
        receive, from the seller computing device, information relating to the first transaction segment at the one or more shipper computers; and
        store the shipping instructions and the information relating to the first transaction segment in association with a tracking identifier; and
    a portable shipper computing device configured to:
        receive the shipping instructions, the information relating to the first transaction segment, and the tracking identifier transmitted from the one or more shipper computers;
        scan the goods and retrieve the shipping instructions and the information relating to the first transaction segment;
        generate a notification that the goods are to be delivered pursuant to an in-person verification of the payment card used in the first transaction segment;
        complete the second transaction segment of the payment card transaction with information received by the shipper from the buyer at the point of delivery of the goods to the buyer, wherein completing the second transaction segment comprises communicating wirelessly with a remote computing entity to determine (a) whether the payment card is valid or (b) an amount of available credit associated with the payment card; and
        generate an indication of whether to relinquish the goods to the buyer in response to completing the second transaction segment of the payment card transaction.

2. The system of claim 1, wherein the payment card is selected from the group consisting of a credit card, a debit card, and a smart card.

3. The system of claim 1, wherein the seller computing device is further configured to:
    receive, from a buyer computing device, payment card information associated with the payment card used by the buyer to purchase the goods.

4. The system of claim 1, wherein the portable shipper computing device is further configured to:
    store the shipping instructions, the information relating to the first transaction segment, and the tracking identifier.

5. The system of claim 1, wherein the portable shipper computing device is further configured to:
    generate an alert in response to a problem being detected with the payment card during the completion of the second transaction segment.

6. The system of claim 1, wherein the portable shipper computing device is further configured to:
   capture an image of the payment card during the completion of the second transaction segment.

7. A system for the delivery of goods being sold by a seller, delivered by a shipper, and purchased by a buyer, the system comprising:
   one or more shipper computers configured to:
      receive shipping instructions, from a seller computing device, to deliver the goods to a buyer pursuant to a payment card transaction involving the buyer, a seller, and a shipper, the payment card transaction requiring at least two segments including: (a) a first transaction segment occurring between the buyer and the seller, wherein the seller charges a payment card of the buyer prior to shipment of the goods from the seller to the buyer, and (b) a second transaction segment occurring between the shipper and the buyer, wherein the shipper at the point of delivery performs an in-person verification of the payment card used in the first transaction segment;
      receive, from the seller computing device, information relating to the first transaction segment;
      store the shipping instructions and the information relating to the first transaction segment in association with a tracking identifier; and
   a portable shipper computing device configured to:
      receive the shipping instructions, the information relating to the first transaction segment, and the tracking identifier transmitted from the one or more shipper computers;
      scan the goods and retrieve the shipping instructions and the information relating to the first transaction segment;
      generate a notification that the goods are to be delivered pursuant to an in-person verification of the payment card used in the first transaction segment;
      complete the second transaction segment at the point of delivery of the goods from the shipper to the buyer, wherein to complete the second transaction segment the portable shipper computing device is further configured to:
         scan the payment card of the buyer;
         use a wireless connection to determine whether the payment card is active and in good standing by using the wireless connection to perform at least one step selected from a group consisting of: (a) determining whether the payment card is valid and (b) determining an amount of available credit associated with the payment card; and
         in response to determining that the payment card is active and in good standing, generate an indication to relinquish the goods to the buyer in response to completing the second transaction segment of the payment card transaction.

8. The system of claim 7, wherein the seller computing device is further configured to:
   receive, from a buyer computing device, payment card information associated with the payment card used by the buyer to purchase the goods.

9. The system of claim 7, wherein the portable shipper computing device is further configured to:
   generate an alert in response to a problem being detected with the payment card during the completion of the second transaction segment.

10. The system of claim 7, wherein the step of scanning the payment card comprises swiping the payment card through a magnetic stripe reader.

11. The system of claim 7, wherein the step of scanning the payment card comprises using a radio frequency identification reader to read an RFID tag associated with the payment card.

12. The system of claim 7, wherein the portable shipper computing device is further configured to:
   capture an image of the payment card during the completion of the second transaction segment.

13. The system of claim 7, wherein the payment card is a card selected from a group consisting of a credit card, a debit card, and a smart card.

14. The system of claim 7, wherein the portable shipper computing device is further configured to:
   store the shipping instructions, the information relating to the first transaction segment, and the tracking identifier.

* * * * *